(12) United States Patent
Jeon

(10) Patent No.: US 9,100,331 B2
(45) Date of Patent: Aug. 4, 2015

(54) METHOD FOR LINKING ETHERNET COMMUNICATION FOR DIGITAL PROTECTIVE RELAY AND THE DIGITAL PROTECTIVE RELAY PERFORMING THE SAME

(71) Applicant: LSIS CO., LTD., Anyang-Si, Gyeonggi-Do (KR)

(72) Inventor: Byung Joon Jeon, Cheongju-Si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 129 days.

(21) Appl. No.: 13/659,727

(22) Filed: Oct. 24, 2012

(65) Prior Publication Data

US 2013/0170395 A1 Jul. 4, 2013

(30) Foreign Application Priority Data

Dec. 30, 2011 (KR) .......................... 10-2011-0147299

(51) Int. Cl.
*H04L 12/28* (2006.01)
*H04L 12/935* (2013.01)
*H04L 12/24* (2006.01)

(52) U.S. Cl.
CPC ........ *H04L 49/3054* (2013.01); *H04L 41/0806* (2013.01); *H04L 41/0866* (2013.01)

(58) Field of Classification Search
CPC ............ H04L 49/3054; H04L 41/0866; H04L 41/0806
USPC .................................................. 370/254, 255
See application file for complete search history.

(56) References Cited

U.S. PATENT DOCUMENTS

| 5,666,359 | A | * | 9/1997 | Bennett et al. | ............... | 370/358 |
| 5,922,052 | A | * | 7/1999 | Heaton | .......... | 709/223 |
| 6,026,494 | A | * | 2/2000 | Foster | .......... | 713/320 |

(Continued)

FOREIGN PATENT DOCUMENTS

KR 20-0379364 3/2005

OTHER PUBLICATIONS

Hernandez, "Gigabit Ethernet Auto-Negotiation," 2001, http://www.dell.com/content/topics/global.aspx/power/en/ps1q01_hernan?c=us&I=en&cs=04.*

(Continued)

*Primary Examiner* — Mark Rinehart
*Assistant Examiner* — Kenneth P Hunt
(74) *Attorney, Agent, or Firm* — Lee, Hong, Degerman, Kang & Waimey

(57) ABSTRACT

A method for establishing an Ethernet communication link of a digital protective relay having at least two communication ports, includes: configuring physical layers of a first communication port and a second communication port; determining whether or not auto-negotiation with respect to the first communication port or the second communication port is successful; and replacing configuration information regarding one of physical layers of the first communication port and the second communication port with configuration information regarding the other of the physical layers of the first communication port and the second communication port according to whether or not the auto-negotiation with respect to the first communication port and the second communication port has been successful. Although Ethernet ports of the digital protective relay are connected without priority, the digital protective relay may perform the same operation.

29 Claims, 3 Drawing Sheets

(56) References Cited

U.S. PATENT DOCUMENTS

| | | | |
|---|---|---|---|
| 6,148,356 A * | 11/2000 | Archer et al. | 710/307 |
| 6,349,331 B1 | 2/2002 | Andra et al. | |
| 6,601,207 B1 * | 7/2003 | Vanttinen | 714/748 |
| 6,859,825 B1 | 2/2005 | Williams | |
| 7,111,104 B2 * | 9/2006 | Chen et al. | 710/306 |
| 8,437,283 B2 * | 5/2013 | Pabst | 370/285 |
| 2002/0046267 A1 | 4/2002 | Andra et al. | |
| 2003/0219025 A1 * | 11/2003 | Choi et al. | 370/401 |
| 2005/0129052 A1 * | 6/2005 | Hurwitz et al. | 370/445 |
| 2007/0041314 A1 * | 2/2007 | Levi et al. | 370/216 |
| 2011/0222395 A1 * | 9/2011 | Ham et al. | 370/217 |
| 2012/0076139 A1 * | 3/2012 | Tanizawa | 370/389 |

OTHER PUBLICATIONS

Korean Intellectual Property Office Application Serial No. 10-2011-0147299, Office Action dated Apr. 12, 2013, 4 pages.

European Patent Office Application Serial No. 12189171.7, Search Report dated May 7, 2013, 7 pages.

The State Intellectual Property Office of the People's Republic of China Application Serial No. 201210410446.2, Office Action dated Apr. 17, 2015, 7 pages.

\* cited by examiner

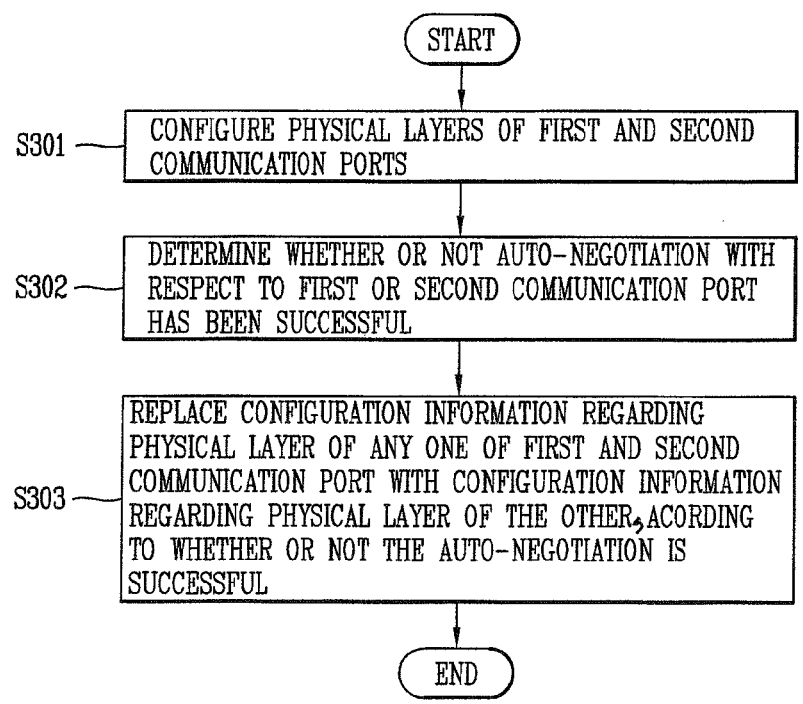
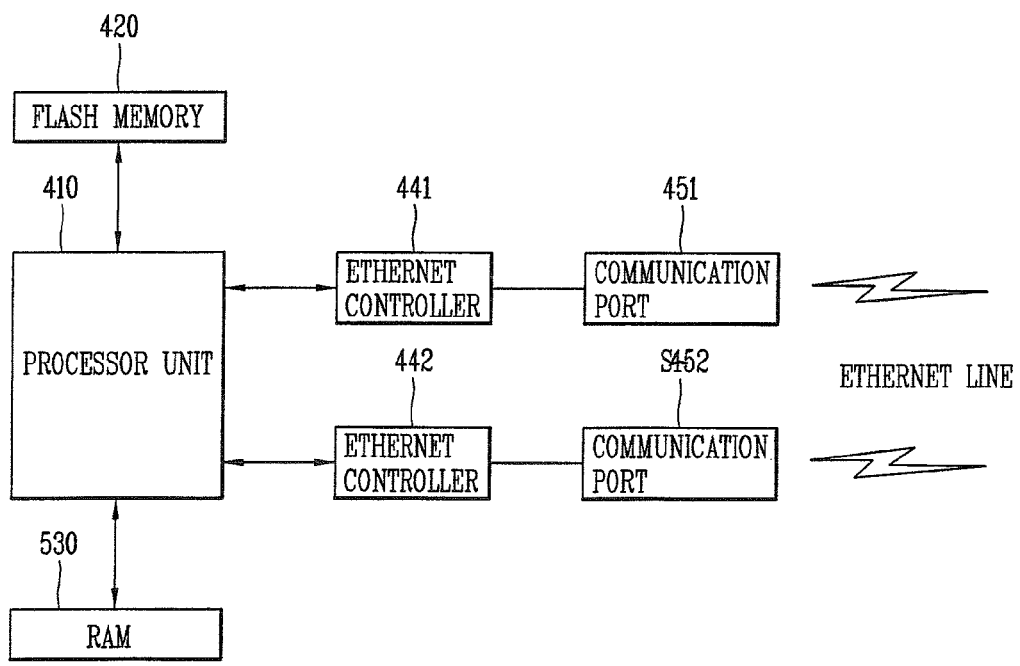

METHOD FOR LINKING ETHERNET COMMUNICATION FOR DIGITAL PROTECTIVE RELAY AND THE DIGITAL PROTECTIVE RELAY PERFORMING THE SAME

Pursuant to 35 U.S.C. §119(a), this application claims the benefit of earlier filing date and right of priority to KR Patent Application No. 10-2011-0147299, filed on Dec. 30, 2011, the contents of which is incorporated by reference herein in its entirety.

FIELD OF THE INVENTION

The present invention relates to a method for linking Ethernet communication for a digital protective relays and a digital protective relay performing the same, and more particularly, to a method for establishing an Ethernet communication link using at least two ports having the same priority, and is a digital protective relay performing the same.

DESCRIPTION OF THE RELATED ART

A digital protective relay (referred to as a 'relay', hereinafter) is connected to a higher supervisory control panel through a communication line to periodically transmit information regarding the relay according to an agreed communication protocol to the higher supervisory control panel. In response to a periodical request from the higher supervisory control panel, the relay configures a response frame with measurement values of voltage, a current, an electric energy, and the like, state information, i.e., fault state information, or the like, and event values, and the like, and sends the same to the higher supervisory control panel. In this case, RS-485 and RS-422 schemes are commonly used as a physical medium of the communication method, and recently, an Ethernet communication scheme having 10BASE-T, 100BASE-TX standards is increasingly used.

Ethernet is a computer network technique developed for a LAN, defining a signal and a line in a physical layer and a media access control (MAC) packet and a format of a protocol in a data link layer of an OSI model. The 10BASE-T, 100BASE-TX standards provide an auto-negotiation function. The auto-negotiation function allows one communication port to compare an operation mode and a transfer rate thereof with those of another communication port and be to automatically converted into an operation mode and a transfer rate corresponding to the comparison result to establish an Ethernet link.

Meanwhile, such an Ethernet link is supported in the relay, but the development of a convenient and intelligent method for establishing the Ethernet link is required.

SUMMARY OF THE INVENTION

An aspect of the present invention provides a method for conveniently and intelligently establishing an Ethernet link of a digital protective relay, and a digital protective relay performing the same.

According to an aspect of the present invention, there is provided a method for establishing an Ethernet communication link of a digital protective relay having at least two communication ports, including: configuring physical layers of a first communication port and a second communication port; determining whether or not auto-negotiation with respect to the first communication port or the second communication port is successful; and replacing configuration information regarding one of physical layers of the first communication port and the second communication port with configuration information regarding the other of the physical layers of the first communication port and the second communication port according to whether or not the auto-negotiation with respect to the first communication port and the second communication port has been successful.

In an embodiment, the determining of whether or not the auto-negotiation has been successful may include initiating a timer having a set expiration term and determining whether or not the timer has expired. Here, the configuration information may include information regarding a transfer rate or a transmission to scheme.

In an embodiment, the configuring of the physical (PHY) layers of the first communication port and the second communication port may include: initiating a timer having a set expiration term; determining whether or not auto-negotiation with respect to the first communication port and the second communication port is has been completed; determining whether or not the timer has expired; and when the auto-negotiation has been completed and the timer has not expired, determining that the auto-negotiation has been successful.

In an embodiment, the determining of whether or not the auto-negotiation has been completed with respect to the first communication port and the second communication port may be performed by checking a particular bit of communication data transmitted or received through the physical layer of the first communication port or the second communication port, and the particular bit may be a bit for indicating whether or not the auto-negotiation has been successful or has failed.

When the auto-negotiation is determined to be successful, setting an auto-negotiation success flag with respect to each communication port may be included. Also, in the determining whether or not the auto-negotiation has been successful, whether or not the auto-negotiation has been successful may be determined by checking the flag value.

According to another aspect of the present invention, there is provided a digital protective relay having at least two communication ports, including: at least two communication ports connected to an Ethernet communication line; and a processor unit to process communication through the Ethernet communication line, wherein the processor unit configures physical layers PHY of the first communication port and the second communication port, determines whether or not auto-negotiation with respect to the first communication port and the second communication port has been successful, and is configured to replace configuration information regarding a physical layer of any one of the first communication port and the second communication port with configuration is information regarding a physical layer of the other according to whether or not the auto-negotiation with respect to the first communication port and the second communication port has been successful.

In order to determine whether or not the auto-negotiation has been successful, the processor unit may be configured to initiate a timer having a set expiration term and determine whether or not the timer has expired.

The configuration information may include information regarding a transfer rate and a transmission scheme.

The processor unit may initiate the timer having a set expiration term, and determine whether or not the auto-negotiation with respect to the first communication port and the second communication port has been completed, and when the auto-negotiation has been completed and the timer has not expired, the processor unit may be configured to determine that the auto-negotiation has been successful.

In an embodiment, in order to determine whether or not the auto-negotiation with respect to the first communication port and the second communication port, the processor unit may be configured to check a particular bit of communication data transmitted or received through a physical layer of the first communication port or the second communication port, and here, the particular bit may indicate whether or not the auto-negotiation has been completed.

In an embodiment, when the auto-negotiation is determined to be successful, the processor unit may set an auto-negotiation success flag with respect to each communication port.

In an embodiment, in order to determine whether or not the auto-negotiation is successful, the processor unit may be configured to check the flag value and determine it.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart illustrating a method for linking Ethernet communication of a digital protective relay according to an embodiment of the present invention; and FIG. 4 is a block diagram of a digital protective relay according to an embodiment of the present invention.

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor is as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

Embodiments of the present invention will be described in detail with reference to the accompanying drawings.

Figure 1:
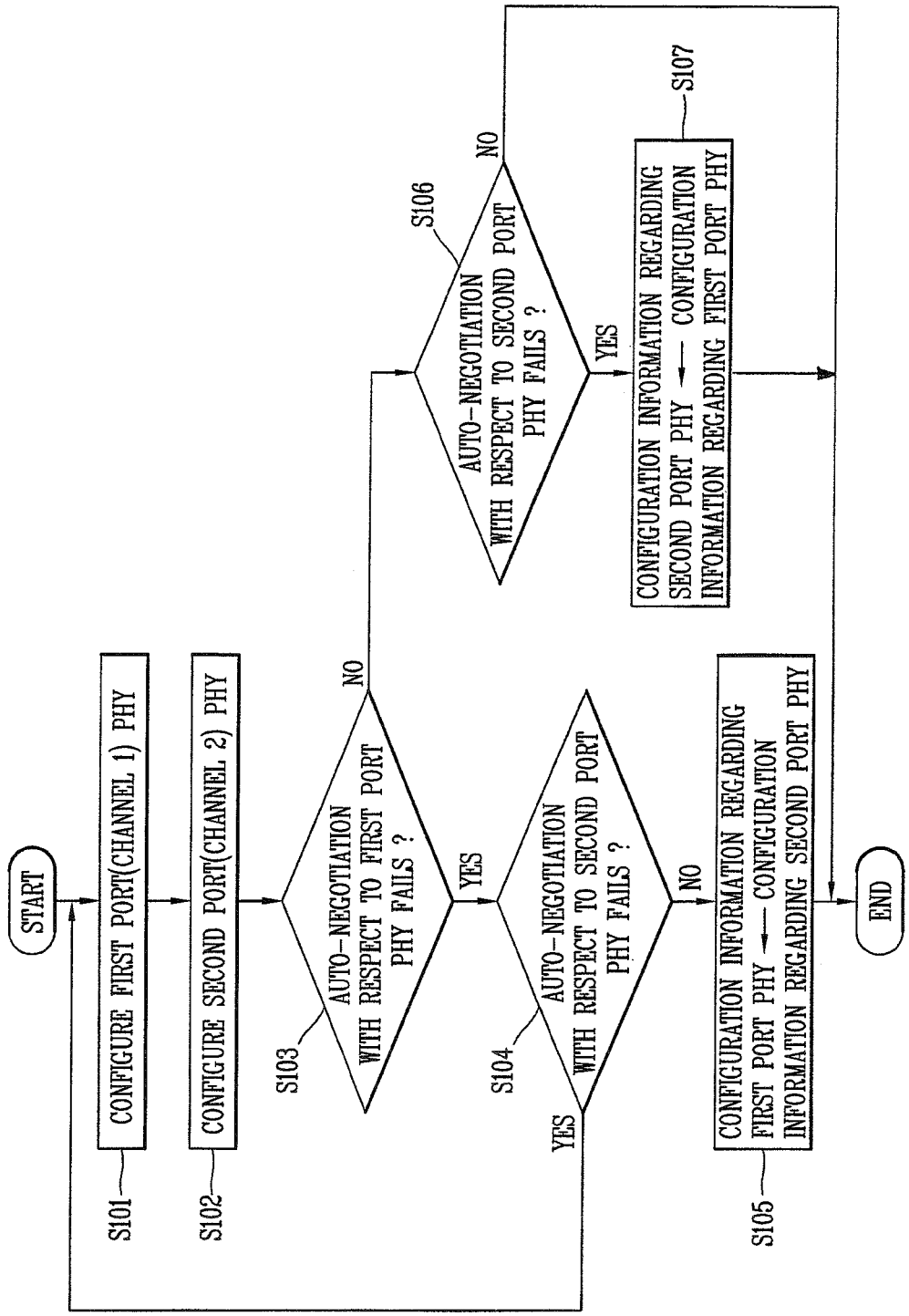
FIG. 1 is a flow chart illustrating a method for linking Ethernet communication of a digital protective relay according to an embodiment of the present invention.

FIG. 1 is a flow chart illustrating a method for linking Ethernet communication of a digital protective relay according to an embodiment of the present invention. The digital protective relay may include at least two Ethernet communication ports (first and second Ethernet communication ports or Ethernet communication ports A and B). Also, the two Ethernet communication ports are not restricted in priority. In other words, the two Ethernet communication ports have the same priority.

The Ethernet communication linking method may include configuring a physical layer of a first port (channel 1) (S101); configuring a physical layer of a second port (channel 2), and determining whether or not auto-negotiation with respect to the physical layer of the first port has failed (S103).

In the configuring of the physical layers of the respective ports, a communication link is established between physical layers of the digital protective relay and a server (e.g., a switching hub). The digital protective relay may perform auto-negotiation to configure the physical layer. The auto-negotiation may be performed between the digital protective relay and the server, and the digital protective relay and the server may determine a transmission mode and a transfer rate supportable by the both sides by comparing mutual transmission modes (e.g., full-duplex, half-duplex, etc.) or transfer rates (e.g., 10 Mbps, 100 Mbps, etc.).

A method for determining whether or not the auto-negotiation has failed will be described with reference to FIG. 2 later.

Meanwhile, when the auto-negotiation with respect to the physical layer of the first port has failed in step S103, step S104 may be performed. Namely, whether or not the auto-negotiation with respect to the physical layer of the second port has failed may be determined (S104). When the auto-negotiation with respect to the physical layer of the second port has failed, auto-negotiation with respect to all the communication ports has failed, so the process is returned to step S101 to configure the physical layer of each port again.

In step S104, when the auto-negotiation with respect to the physical layer of the second port has not failed, namely, when the auto-negotiation is successful, step S105 may be performed. In this case, since the auto-negotiation with respect to the physical layer of the first port has failed and the auto-negotiation with respect to the physical layer of the second port is successful, configuration information regarding the physical layer of the second port may be used as configuration information regarding the physical layer of the first port or the configuration information regarding the physical layer of the first port may be replaced with the configuration information regarding the physical layer of the second port.

Namely, since both the first port and the second port perform Ethernet communication configuration in the same communication environment, the communication port which has failed the auto-negotiation may successfully establish a communication link by using configuration information regarding a communication port which has successfully performed the physical layer configuration and auto-negotiation as configuration information regarding the communication port which has failed the auto-negotiation. Thereafter, the method for establishing a communication link according to an embodiment of the present invention may be terminated.

When the auto-negotiation with respect to the physical layer of the first port has not failed in step S103, step S106 may be performed. Namely, whether or not the auto-negotiation with respect to the physical layer of the second port has failed may be determined (S106).

When the auto-negotiation with respect to the physical layer of the second port has failed in step S106, step S107 may be performed. In this case, since the auto-negotiation with respect to the physical layer of the first port is successful, and the auto-negotiation with respect to the physical layer of the second port has failed, the configuration information regarding the physical layer of the first port may be used as the configuration information regarding the physical layer of the second port or may replace the configuration information regarding the physical layer of the second layer. Namely, since the Ethernet communication is performed in the both the first port and the second port in the same communication environment, when any one of the ports has successfully established the Ethernet link, the configuration information of the port which has successfully established the Ethernet link may be input to or set in the other remaining port, thereby successfully establishing the Ethernet link with respect to all the ports.

In step S106, when the auto-negotiation with respect to the physical layer of the second port is successful, the process may be terminated. In this case, is since the auto-negotiations with respect to the physical layers of all the ports are successful, the process is terminated without performing any additional procedure.

Figure 2:
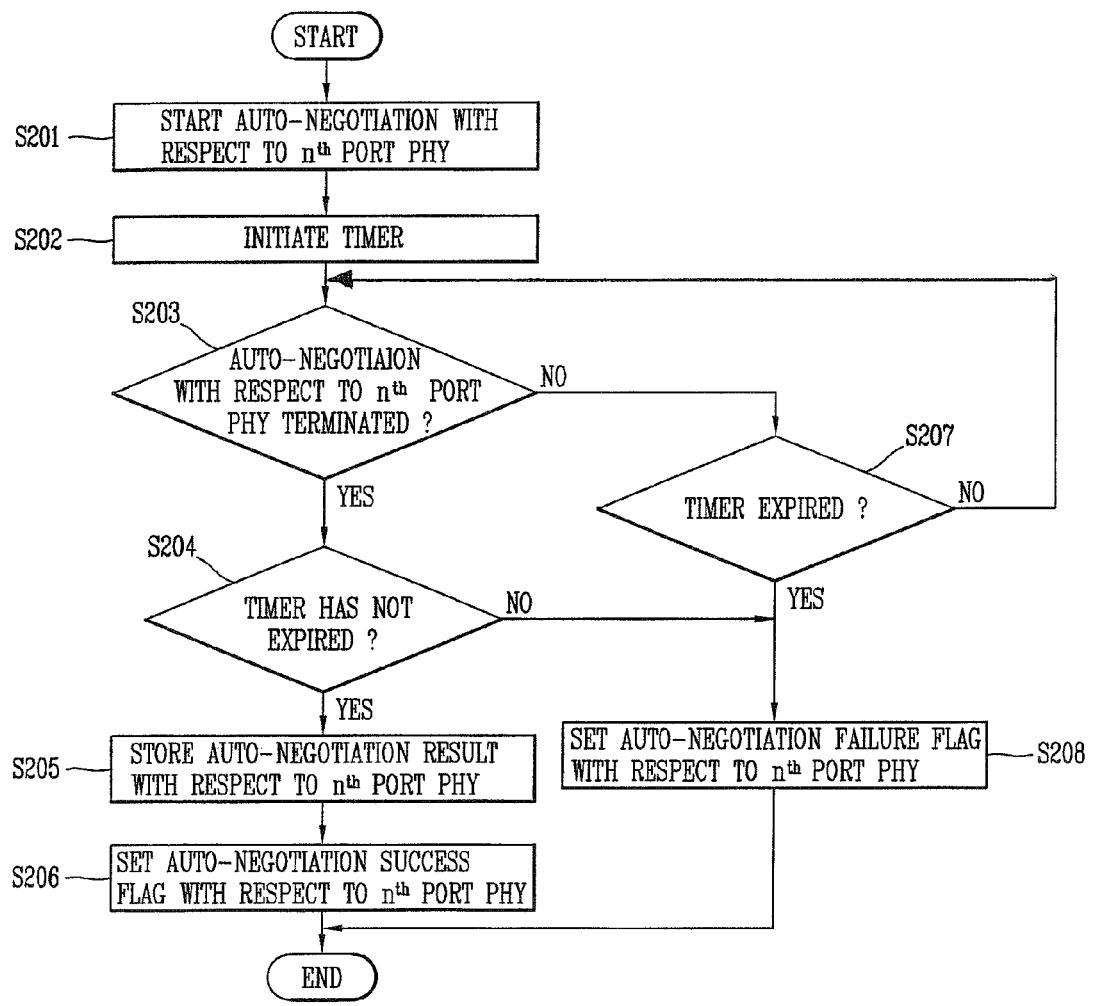
FIG. 2 is a flow chart illustrating a method for linking Ethernet communication of a digital protective relay according to an embodiment of the present invention.

FIG. 2 is a flow chart illustrating a method for linking Ethernet communication of a digital protective relay according to an embodiment of the present invention. The flow chart illustrated in FIG. 2 is an embodiment for explaining in more detail steps S101 and S102 described above with reference to FIG. 2. In FIG. 2, a port will be expressed as 'nth port' that can be obviously applicable to any port.

Auto-negotiation with respect to a physical layer of the nth port may be started (S201). In step S202, a timer having a predetermined expiration term may be initiated (S202). The expiration term of the timer is set to determine whether or not the timer expires as described hereinafter, and a temporal factor (expiration term0 is added as a factor for determining whether or not the auto-negotiation of the physical layer of the nth port has been successful. When failure or success of the auto-negotiation is completed within the expiration term, it may be determined that the auto-negotiation has been successfully performed.

Thereafter, whether or not the auto-negotiation with respect to the physical layer of the nth port has been terminal may be determined (S203). Whether or not the auto-negotiation has been terminal may be determined by detecting a particular bit of communication data transmitted or received through the physical layer of the nth port. The particular bit is a bit for indicating whether or not the auto-negotiation has been successful or has failed.

When the auto-negotiation is terminated in step S203, step S204 may be performed. In step S204, whether or not the timer has expired may be checked. When the timer has not expired, step S205 may be performed.

When the timer has not expired in step S204, since the configuration of the physical layer of the nth port has been successfully performed, the auto-negotiation result with respect to the physical layer of the nth port is stored (S205), and an auto-negotiation success flag with respect to the physical layer of the nth port may be set (S206). The flag may be set to 0 or 1 to discriminate a case in which the auto-negotiation is terminated to failure and a case in which the auto-negotiation is terminated to success.

When the timer has expired in step S204, the auto-negotiation is terminated to failure, so step S208 may be performed. The auto-negotiation failure flag may be set with respect to the physical layer of the nth port in step S208.

When the auto-negotiation with respect to the physical layer of the nth port has not been terminated in step S203, step S208 may be performed. Whether or not the timer has expired may be determined in step S207.

When the timer has not expired in step S207, since the auto-negotiation has not been completed, the process is returned to step S203.

When the timer has expired in step S207, the auto-negotiation has been terminated to failure, so step S208 is performed. The auto-negotiation failure flag with respect to the physical layer of the nth port may be set in step S208.

In this manner, in the method for establishing an Ethernet link according to an embodiment of the present invention, an Ethernet link may be established for all the communication ports without having priority to the respective communication ports.

FIG. 3 is a flow chart illustrating a method for linking Ethernet communication of a digital protective relay according to an embodiment of the present invention. FIG. 3 is a flow chart illustrating a method for linking Ethernet communication of a digital protective relay in relation to FIGS. 1 and 2.

The method is a method for establishing an Ethernet communication link of a digital protective relay having at least two communication ports including setting physical layers of a first communication port and a second communication port (S301); determining whether or not auto-negotiation with respect to the first communication port or the second communication port is successful (S302); and replacing configuration information regarding a physical layer of any one of the first communication port and the second communication port with configuration information regarding a physical layer of the other according to whether or not the auto-negotiation with respect to the first communication port and the second communication port has been successful.

In step S301 of setting the physical layers PHY of the first communication port and the second communication port, physical layers for communication between the digital protective relay and the server (or a counterpart, e.g., a switching hub) may be configured. The configuration of the physical layers may be performed through auto-negotiation, and in this case, the digital protective relay and the server compare the configuration information supported by themselves, respectively, and set configuration information that can be supported by both of them.

Here, the configuration information may include may include information to regarding a transfer rate or a transmission scheme, and as mentioned above, the digital protective relay and the server may check a transfer rate or a transmission scheme supported by them and configure the physical layer according to a transfer rate or a transmission scheme supported by both of them.

Determining of whether or not the auto-negotiation is successful (302) may include initiating a timer having a set expiration term and determining whether or not the timer has expired. Also, the determining of whether or not the auto-negotiation is successful may be performed by checking a particular bit of communication data transmitted or exchanged through the physical layer of the first communication port or the second communication port. The particular bit is a bit for indicating whether or not the auto-negotiation has been successful or has failed.

Also, the configuring of the physical (PHY) layers of the first communication port and the second communication port may include initiating a timer having a set expiration term; determining whether or not auto-negotiation with respect to the first communication port and the second communication port has been completed; determining whether or not the timer has expired; and when the auto-negotiation has been completed and the timer has not expired, determining that the auto-negotiation has been successful. Here, when the auto-negotiation is determined to be successful, setting an auto-negotiation success flag with respect to each communication port may be included. Also, in the determining whether or not the auto-negotiation has been successful, whether or not the auto-negotiation has been successful may be determined by checking the flag value.

Here, a description of the setting of the flag has been provided in relation to FIG. 2, so a repeated description thereof will be omitted.

FIG. 4 is a block diagram of a digital protective relay according to an embodiment of the present invention. The digital protective relay may include a processor unit 410 to control a sequential operation of the digital protective relay; a flash memory 420 to store the firmware for operating the digital protective relay, is a RAM as a region in which the firmware is executed; Ethernet controllers 441 and 442 to decode and code data for Ethernet communication; and communication ports 451 and 452 connected to an Ethernet communication line for Ethernet communication. The communication ports 451 and 452 may be designated as a first communication port and a second communication port, respectively. Also, the first communication port and the second communication port may have the same priority.

The processor unit 410 may perform the method for linking Ethernet communication according to an embodiment of the present invention described above with reference to FIGS. 1 to 3.

The processor unit 410 configures physical layers PHY of the first communication port and the second communication port, determines whether or not auto-negotiation with respect to the first communication port and the second communication port has been successful, and may be configured to replace configuration information regarding a physical layer of any one of the first communication port and the second communication port with configuration information regarding a physical layer of the other according to whether or not the auto-negotiation with respect to the first communication port and the second communication port has been successful.

Here, the configuration information may include information regarding a to transfer rate or a transmission scheme.

Also, in order to determine whether or not the auto-negotiation has been successful, the processor unit 410 may be configured to initiate a timer having a set expiration term and determine whether or not the timer has expired.

Also, the processor unit 410 initiates the timer having a set expiration term, and determines whether or not the auto-negotiation with respect to the first communication port and the second communication port has been completed. When the auto-negotiation has been completed and the timer has not expired, the processor unit 410 may be configured to determine that the auto-negotiation has been successful.

When the auto-negotiation is determined to be successful, the processor unit 410 may be configured to set an auto-negotiation success flag with respect to each communication port, and in order to determine whether or not the auto-negotiation has been successful, the processor unit 420 may be configured to check the flag value to determine it.

In this manner, according to an embodiment of the present invention, the Ethernet ports of the digital protective relay are used without priority. For example, no matter whether an Ethernet communication line is connected to the Ethernet port A or the Ethernet port B, the digital protective relay may perform the same operation. Also, when auto-negotiation of any of the Ethernet port A and the Ethernet port B is completed, the information obtained after performing the auto-negotiation may be used for the other, thereby establishing an Ethernet communication environment.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for establishing an Ethernet communication link of a digital protective relay having at least two communication ports, the method comprising:
    configuring at least one physical (PHY) layer of a first communication port and a second communication port of the at least two communication ports;
    determining whether or not auto-negotiation with respect to the first communication port and the second communication port is successful; and
    replacing configuration information related to the configured at least one PHY layer of the first communication port or second communication port with configuration information related to the at least one PHY layer of the first communication port or second communication port, the replacement according to the determination of whether the auto-negotiation is successful,
    wherein a first type of auto negotiation carried out by the first communication port and a second type of auto negotiation carried out by the second communication port are a same type of auto negotiation that use a same protocol, and
    wherein the second type of auto negotiation is carried out sequentially after the first type of auto negotiation.

2. The method of claim 1, wherein determining whether the auto-negotiation is successful comprises:
    initiating a timer having a set expiration term; and
    determining whether the timer has expired.

3. The method of claim 1, wherein the configuration information comprises information related to a transfer rate or a transmission scheme.

4. The method of claim 1, wherein configuring the at least one PHY layer comprises:
    initiating a timer having a set expiration term;
    determining whether auto-negotiation with respect to each of the first communication port and second communication port has been completed;
    determining whether the timer has expired; and
    determining that the auto-negotiation is successful when the auto-negotiation has been complete and the timer has not expired.

5. The method of claim 4, wherein:
    determining whether the auto-negotiation has been completed comprises checking a particular bit of communication data transmitted or received via the at least one PHY layer of the first communication port or second communication port; and
    the particular bit indicates whether the auto-negotiation is successful.

6. The method of claim 4, further comprising setting an auto-negotiation success flag with respect to each of the first communication port and second communication port when it is determined that the auto-negotiation is successful.

7. The method of claim 6, wherein determining whether the auto-negotiation is successful comprises checking a value of the auto-negotiation success flag.

8. A digital protective relay, comprising:
    at least a first communication port and a second communication port each connected to an Ethernet communication line; and
    a processor unit configured to:
    process communication via the Ethernet communication line;

configure at least one physical (PHY) layer of each of the at least first communication port and the second communication port;

determine whether auto-negotiation with respect to each of the at least the first communication port and the second communication port is successful; and replace configuration information related to the configured at least one PHY layer of the at least the first communication port or the second communication port with configuration information related to the at least one PHY layer of the other of the first communication port or second communication port, the replacement according to the determination of whether the auto-negotiation is successful, wherein a first type of auto negotiation carried out by the first communication port and a second type of auto negotiation carried out by the second communication port are a same type of auto negotiation that use a same protocol, and wherein the second type of auto negotiation is carried out sequentially after the first type of auto negotiation.

9. The digital protective relay of claim 8, wherein determining whether the auto-negotiation is successful comprises:
initiating a timer having a set expiration term; and
determining whether the timer has expired.

10. The digital protective relay of claim 8, wherein the configuration information includes information related to a transfer rate or a transmission scheme.

11. The digital protective relay of claim 8, wherein configuring the at least one PHY layer comprises:
initiating a timer having a set expiration term;
determining whether the auto-negotiation with respect to each of the at least first communication port and the second communication port has been completed; and
determining that the auto-negotiation is successful when the auto-negotiation has been completed and the timer has not expired.

12. The digital protective relay of claim 11, wherein:
determining whether the auto-negotiation has been completed comprises checking a particular bit of communication data transmitted or received via the at least one PHY layer of the at least the first communication port or the second communication port; and
the particular bit indicates whether the auto-negotiation has been successful.

13. The digital protective relay of claim 11, wherein the processor is further configured to set an auto-negotiation success flag with respect to each of the at least the first communication port and the second communication port when it is determined that the auto-negotiation is successful.

14. The digital protective relay of claim 13, wherein determining whether the auto-negotiation is successful comprises checking a value of the auto-negotiation success flag.

15. The method of claim 2, wherein the configuration information comprises information related to a transfer rate or a transmission scheme.

16. The method of claim 2, wherein configuring the at least one PHY layer comprises:
initiating a timer having a set expiration term;
determining whether auto-negotiation with respect to each of the first communication port and second communication port has been completed;
determining whether the timer has expired; and
determining that the auto-negotiation is successful when the auto-negotiation has been completed and the timer has not expired.

17. The method of claim 3, wherein configuring the at least one PHY layer comprises:
initiating a timer having a set expiration term;
determining whether auto-negotiation with respect to each of the first communication port and second communication port has been completed;
determining whether the timer has expired; and
determining that the auto-negotiation is successful when the auto-negotiation has been completed and the timer has not expired.

18. The method of claim 16, wherein:
determining whether the auto-negotiation has been completed comprises checking a particular bit of communication data transmitted or received via the at least one PHY layer of the first communication port or second communication port; and
the particular bit indicates whether the auto-negotiation has been successful.

19. The method of claim 17, wherein:
determining whether the auto-negotiation has been completed comprises checking a particular bit of communication data transmitted or received via the at least one PHY layer of the first communication port or second communication port; and
the particular bit indicates whether the auto-negotiation has been successful.

20. The method of claim 3, further comprising:
determining whether the auto-negotiation has been completed by checking a particular bit of communication data transmitted or received via the at least one PHY layer of the first communication port or second communication port,
wherein the particular bit indicates whether the auto-negotiation has been successful.

21. The method of claim 1, further comprising setting an auto-negotiation success flag with respect to each of the first communication port and second communication port when it is determined that the auto-negotiation is successful.

22. The method of claim 2, further comprising setting an auto-negotiation success flag with respect to each of the first communication port and second communication port when it is determined that the auto-negotiation is successful.

23. The method of claim 3, further comprising setting an auto-negotiation success flag with respect to each of the first communication port and second communication port when it is determined that the auto-negotiation is successful.

24. The method of claim 5, further comprising setting an auto-negotiation success flag with respect to each of the first communication port and second communication port when it is determined that the auto-negotiation is successful.

25. The method of claim 24, wherein determining whether the auto-negotiation is successful comprises checking a value of the auto-negotiation success flag.

26. The digital protective relay of claim 9, wherein the configuration information includes information related to a transfer rate or a transmission scheme.

27. The digital protective relay of claim 9, wherein configuring the at least one PHY layer comprises:
initiating a timer having a set expiration term;
determining whether the auto-negotiation with respect to each of the at least the first communication port and the second communication port has been completed; and
determining that the auto-negotiation is successful when the auto-negotiation has been completed and the timer has not expired.

28. The digital protective relay of claim 10, wherein configuring the at least one PHY layer comprises:
  initiating a timer having a set expiration term;
  determining whether the auto-negotiation with respect to each of the at least the first communication port and the second communication port has been completed; and
  determining that the auto-negotiation is successful when the auto-negotiation has been completed and the timer has not expired.

29. The digital protective relay of claim 12, wherein determining whether the auto-negotiation is successful comprises checking a value of an auto-negotiation success flag.

\* \* \* \* \*